US009535267B2

(12) United States Patent
Trigg et al.

(10) Patent No.: US 9,535,267 B2
(45) Date of Patent: Jan. 3, 2017

(54) EYEWEAR PROVIDING ANATOMICALLY STABILIZED CONTROL OF AN ASSOCIATED ELECTRONIC DEVICE

(71) Applicant: iWare LLC, Littleton, CO (US)

(72) Inventors: Jonathan Hutton Trigg, Saint Petersburg, FL (US); Antony Frederic Trigg, Saint Petersburg, FL (US); Steven Michel Trigg, Littleton, CO (US)

(*) Notice: Subject to any disclaimer, the term of this patent is extended or adjusted under 35 U.S.C. 154(b) by 122 days.

(21) Appl. No.: 14/658,205

(22) Filed: Mar. 15, 2015

(65) Prior Publication Data

US 2016/0266413 A1    Sep. 15, 2016

(51) Int. Cl.
*G02C 11/00*    (2006.01)
*G02C 5/14*    (2006.01)

(52) U.S. Cl.
CPC ............. *G02C 11/10* (2013.01); *G02C 5/14* (2013.01); *G02C 5/143* (2013.01); *G02C 11/00* (2013.01)

(58) Field of Classification Search
CPC ........... G02C 11/00; G02C 11/10; G02C 5/14; G02C 5/143
USPC ......................................... 351/120, 123, 158
See application file for complete search history.

(56) References Cited

U.S. PATENT DOCUMENTS

| | | | |
|---|---|---|---|
| 3,840,294 A * | 10/1974 | Kneier | G02C 5/005 351/107 |
| 5,193,534 A | 3/1993 | Peppler | |
| 5,347,325 A | 9/1994 | Lei | |
| 6,176,576 B1 | 1/2001 | Green | |
| 6,325,507 B1 | 12/2001 | Jannard | |
| 6,926,403 B2 * | 8/2005 | Yi | G02C 11/08 351/123 |
| 6,986,577 B1 * | 1/2006 | Jamie | G02C 5/10 351/111 |
| 7,011,406 B1 * | 3/2006 | Kim | G02C 11/00 351/111 |
| 7,147,324 B2 | 12/2006 | Jannard | |
| D561,233 S | 2/2008 | McLaughlin | |
| 8,665,177 B2 | 3/2014 | Herrmann | |
| 2003/0090439 A1 * | 5/2003 | Spitzer | G02B 27/0172 345/8 |
| 2006/0082723 A1 * | 4/2006 | Jamie | G02C 3/003 351/123 |
| 2006/0098160 A1 * | 5/2006 | Jamie | G02C 3/003 351/123 |
| 2006/0132382 A1 * | 6/2006 | Jannard | G02C 11/06 345/8 |
| 2007/0248238 A1 * | 10/2007 | Abreu | G02C 3/003 381/381 |
| 2012/0040301 A1 * | 2/2012 | Ngiam | A61C 7/06 433/5 |

(Continued)

FOREIGN PATENT DOCUMENTS

WO    2013062899 A1    5/2013

*Primary Examiner* — Bumsuk Won
*Assistant Examiner* — William R Alexander
(74) *Attorney, Agent, or Firm* — David Kiewit

(57) ABSTRACT

Control of an electronic device integrated with eyewear is facilitated by the use of anatomical reference points. Palpable alignment features, such as protrusions, notches etc. on the eyewear are aligned with anatomic reference points to put a user's fingers into a desired spatial relationship with a control for the device.

14 Claims, 7 Drawing Sheets

(56) References Cited

U.S. PATENT DOCUMENTS

| | | | |
|---|---|---|---|
| 2014/0253867 A1* | 9/2014 | Jiang | G02C 11/10 351/158 |
| 2015/0216288 A1* | 8/2015 | Offner | A45D 44/22 351/158 |
| 2016/0062137 A1* | 3/2016 | Perez | G02C 5/143 351/123 |
| 2016/0262922 A1* | 9/2016 | Portney | A61F 5/01 |

* cited by examiner

100
EYEWEAR PROVIDING ANATOMICALLY STABILIZED CONTROL OF AN ASSOCIATED ELECTRONIC DEVICE

BACKGROUND OF THE INVENTION

The inventions described herein are directed at lightweight electronic devices integrated with eyewear.

BACKGROUND INFORMATION

Electronic devices such as audio players, hearing aids, video cameras and video displays are often mounted on or near a user's head. In particular, devices having an audio output may have a portion that is mounted on or within the user's ear so as to minimize the power required to provide a useful output signal.

A problem with prior art arrangements integrating an electronic device with eyewear is failure to provide a usable and effective control interface that the user can use to make operating adjustments to the device. This often leads to designs that require doffing the associated eyewear, then looking at the adjustment mechanism in order to make changes, and then re-donning the eyewear.

BRIEF SUMMARY OF THE INVENTION

One aspect of the invention is that it provides apparatus comprising eyewear integrated with a battery powered electronic device. The eyewear is configured to guide a user's finger(s) into a desired spatial relationship with a pushbutton, control pad or other input portion of the electronic device disposed on a temple portion of the eyewear. The preferred eyewear comprises a temple having a palpable alignment feature in a portion extending below a prominence of a user's cheekbone when the eyewear is worn. The preferred control is disposed on the temple adjacent the alignment feature and the position of the alignment feature is selected so that when the eyewear is worn the user's thumb (or other digit), when pushed into a space below the prominence of his or her cheekbone, engages the alignment feature and at least one other of the user's fingers is guided to contact the control element in the desired spatial relationship.

Another aspect of the invention is that it provides a preferred combination of an eyewear and a battery powered electronic device having an audio output. The preferred eyewear comprises a temple having both a tubular intra-conchal rear support portion and an alignment feature formed in a portion extending below a prominence of a user's cheekbone when the eyewear is worn. The preferred device comprises a control disposed on the eyewear temple adjacent the alignment feature. The position of the alignment feature is selected so that when the eyewear is worn the user's thumb, when pushed into a space below the prominence of his or her cheekbone, engages the alignment feature and at least one other of the user's fingers contacts the control so that the user can control at least an audio output of the device, the output being supplied through the tubular rear support portion of the temple to the user's ear.

Yet another aspect of the invention is that it provides a method of delivering to a user an audio output of an electronic device fixedly attached to an item of eyewear having at least one temple having a portion disposed below the user's zygomatic arch. A preferred electronic device comprises a control element adjacent an alignment feature on the temple of the eyewear. A user carrying out the preferred method puts on the eyewear, engages the alignment feature by pushing a first of his or her digits, preferably his or her thumb, into the zygomatic pocket so that a second of his or her digits is positioned in a selected spatial relationship to the control. This allows the user to operate the control to select a desired audio output which is then delivered to the user's ear by means of an intra-conchal rear support portion of the temple.

Those skilled in the art will recognize that the foregoing broad summary description is not intended to list all of the features and advantages of the invention. Both the underlying ideas and the specific embodiments disclosed in the following Detailed Description may serve as a basis for alternate arrangements for carrying out the purposes of the present invention and such equivalent constructions are within the spirit and scope of the invention in its broadest form. Moreover, different embodiments of the invention may provide various combinations of the recited features and advantages of the invention, and that less than all of the recited features and advantages may be provided by some embodiments.

DETAILED DESCRIPTION OF A PREFERRED EMBODIMENT

In studying this Detailed Description, the reader may be aided by noting definitions of certain words and phrases used throughout this patent document. Wherever those definitions are provided, those of ordinary skill in the art should understand that in many, if not most, instances such definitions apply both to preceding and following uses of such defined words and phrases.

Figure 1A:
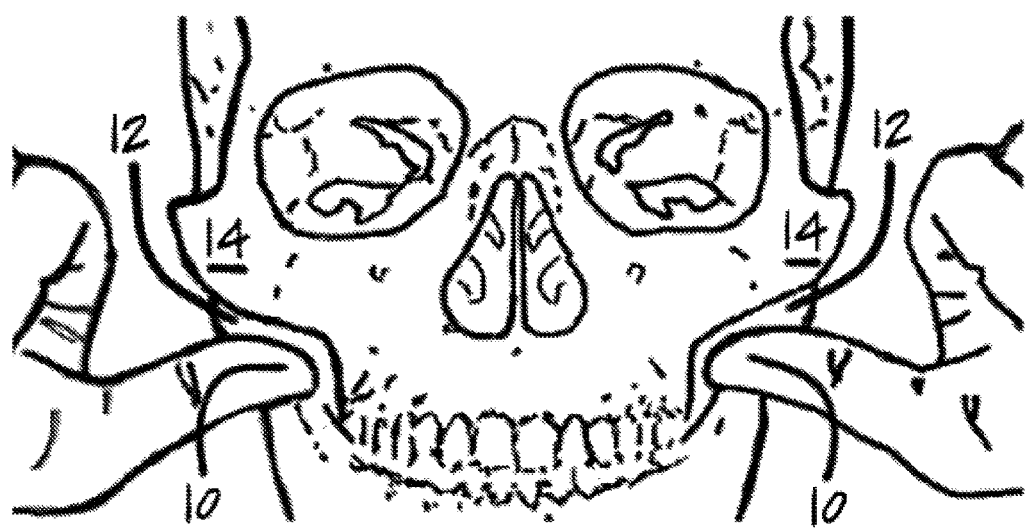
FIGS. 1A and 1B are partly schematic depictions of human anatomical features used in practicing preferred embodiments of the invention.
Figure 1B:
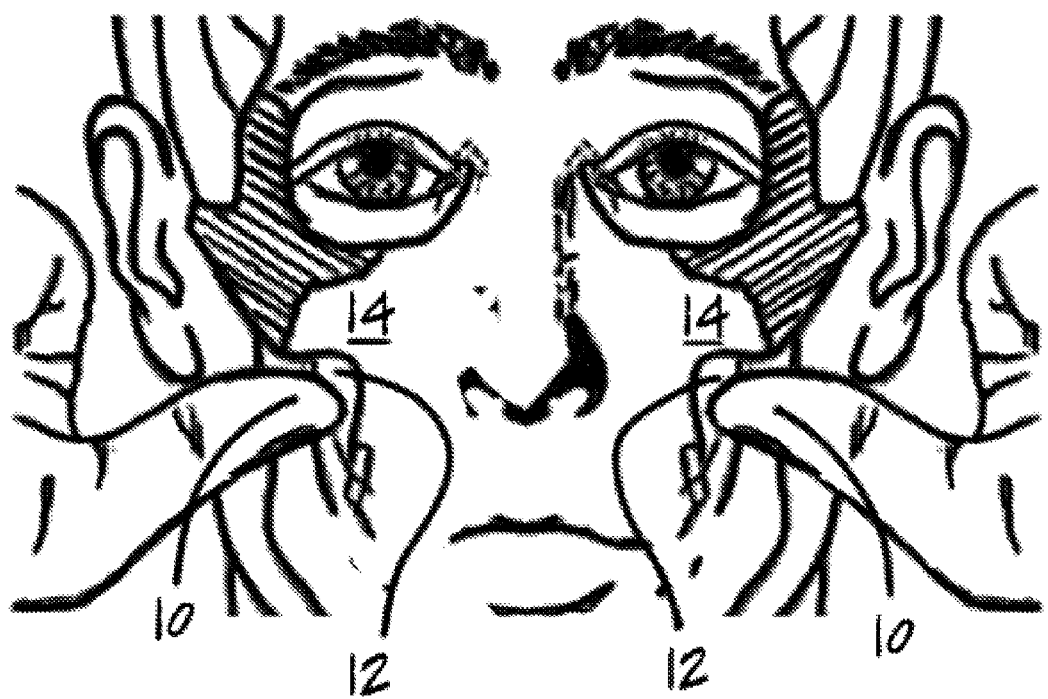

Turning now to FIGS. 1A and 1B one finds anatomical views depicting a person inserting his or her thumbs 10 into respective zygomatic pockets 12 disposed beneath associated zygomatic arches 14. Throughout this document the anatomical terms zygomatic arch and zygomatic pocket will also be referred to, respectively, as a cheekbone prominence and as a space beneath the cheekbone prominence.

Inserting one's thumbs into zygomatic pockets is sometimes used for holding binoculars steady and minimizing the effects of muscular tremors. In the binocular-holding situation a user is taught to achieve greater rigidity by placing her thumbs in respective zygomatic pockets (or on respective zygomatic arches), holding her index fingers on the tops of the binocular's eyepieces and against her forehead, and tucking her elbows against her ribs.

Figure 2A:
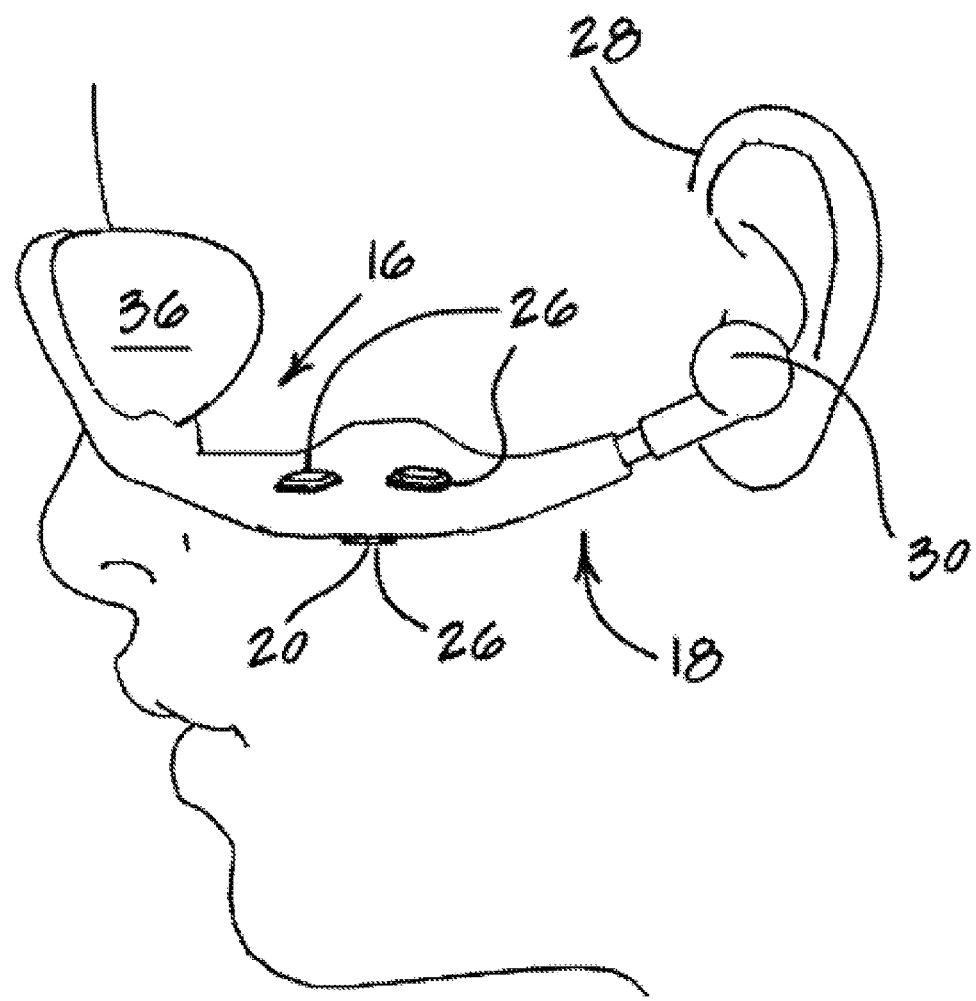
FIG. 2A is a side view of an eyewear temple or sidepiece comprising a first alignment feature, the temple further comprising an ear bud providing an audio output and rear support for the eyewear.
Figure 2B:
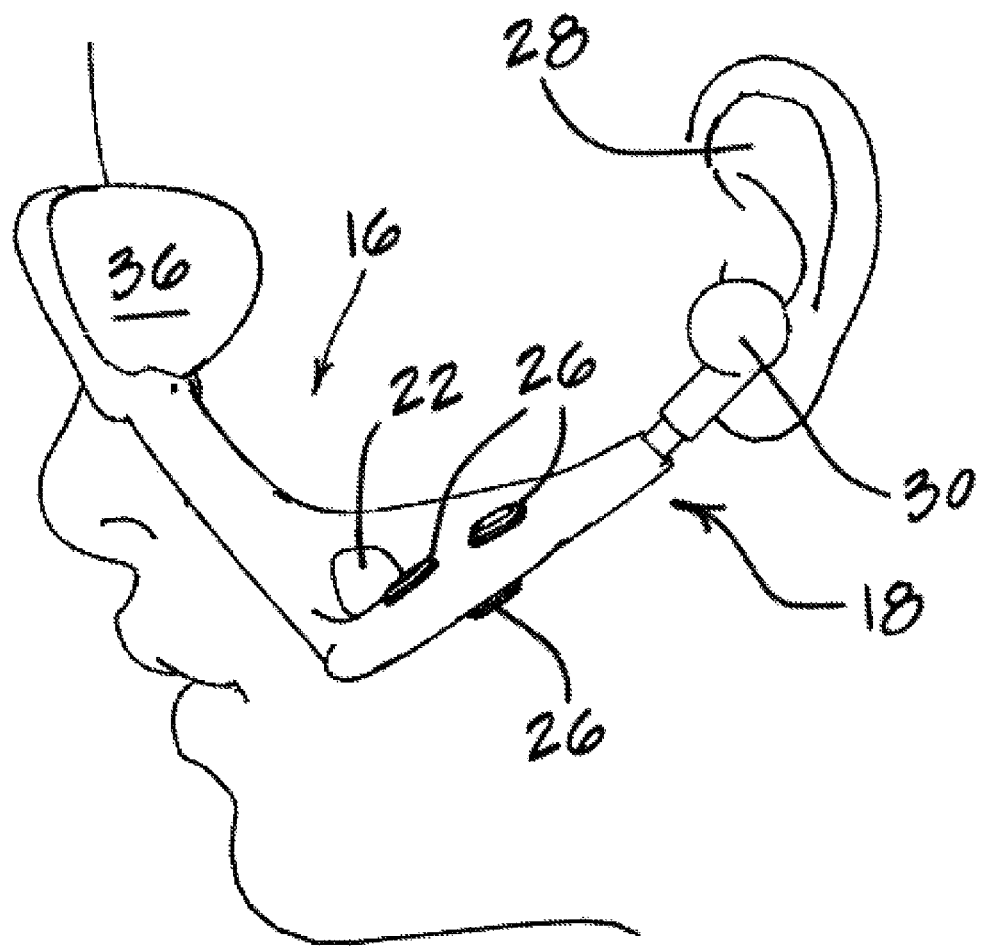
FIG. 2B is a side view of an eyewear temple comprising a second alignment feature, the temple further comprising an ear bud providing an audio output and rear support for the temple.
Figure 4:
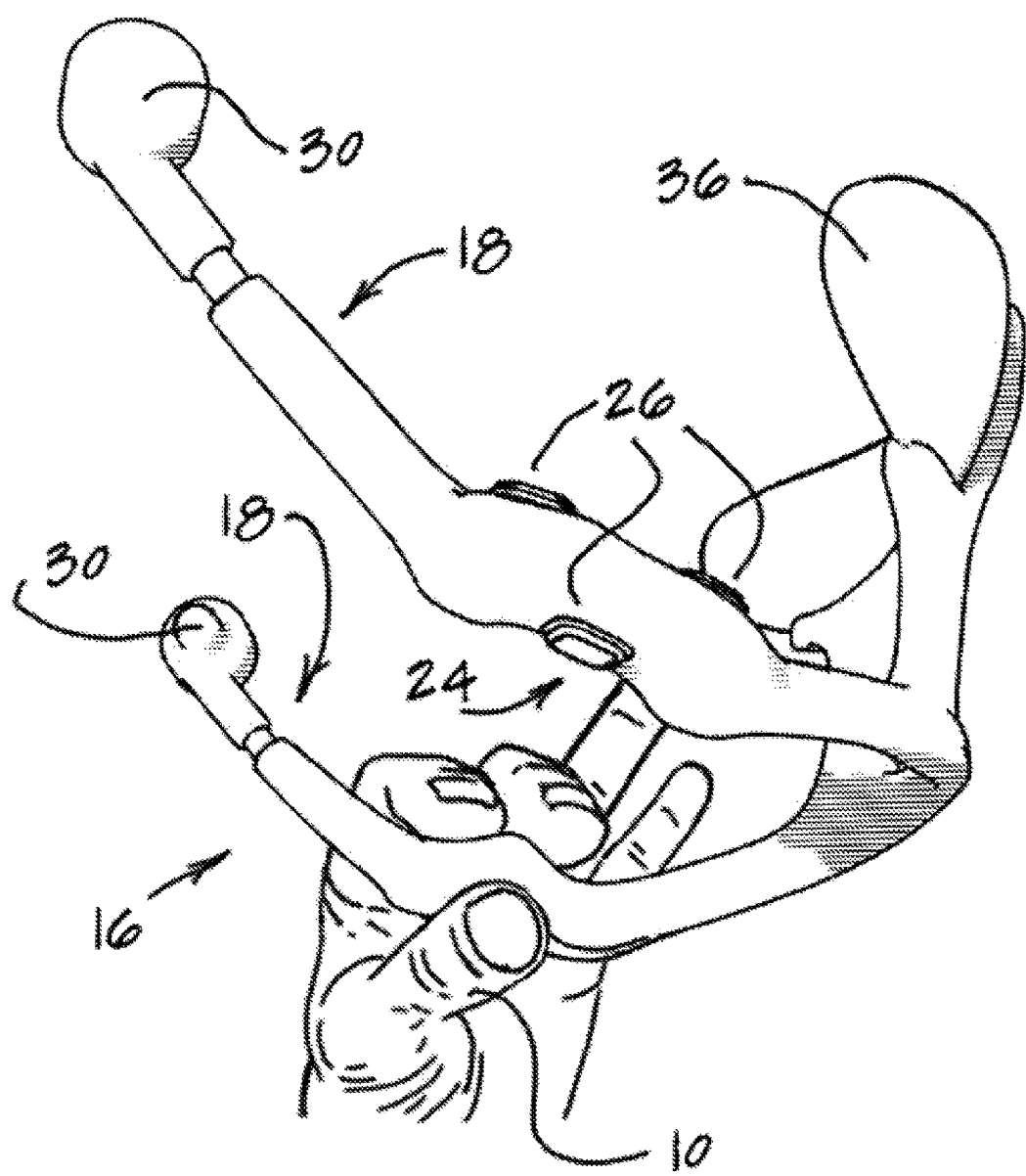
FIG. 4 is a perspective view of a user's hand accessing control elements on eyewear of the invention.

Turning now to FIG. 2A, one finds a partly schematic side view of eyewear 16 having a multi-part temple 18 or sidepiece disposed below a wearer's zygomatic arch and having a protrusion 20 (which may be a pushbutton switch or other control element) serving as an alignment feature for contact by a user's thumb. FIG. 2B is similar to 2A, but shows a throughhole 22 useable as an alignment feature through which a user may insert a selected finger. Further, FIG. 4 shows a temple 18 having an alignment notch 24 contactable by a user's thumb 10. It may be noted that any of a wide variety of palpable elements can serve as an alignment feature to be contacted by a selected one of a user's digits and used to guide at least one other digit into a spatially defined and user-recognized contact with a control for an electronic device.

A variety of control elements for electronic devices can be used in practicing the invention. In depicted embodiments a triad of tactile buttons 26 is used, but the invention is not so limited. Other control input elements, such slider switches or a capacitive mousing surface, of a sort familiar to users of laptop computers and smartphones, may also be used on one or both temples of an eyewear 16.

Correspondingly, the invention may be used to control a wide variety of electronic devices. In most cases of interest an electronic device integrated with eyewear is of an audio-visual sort and has at least an audio output. In preferred embodiments of the invention an audio output is controlled by the control element and is delivered to the user's ear 28 through an intra-conchal ear bud 30 that also serves as a rear support for the temple 18 of the associated eyewear 16. The reader will recognize that the functions of support and audio delivery can be separated and that the inventive control features can be used with eyewear having a conventional ear loop (not shown) and a separate speaker or ear bud.

Figure 3A:
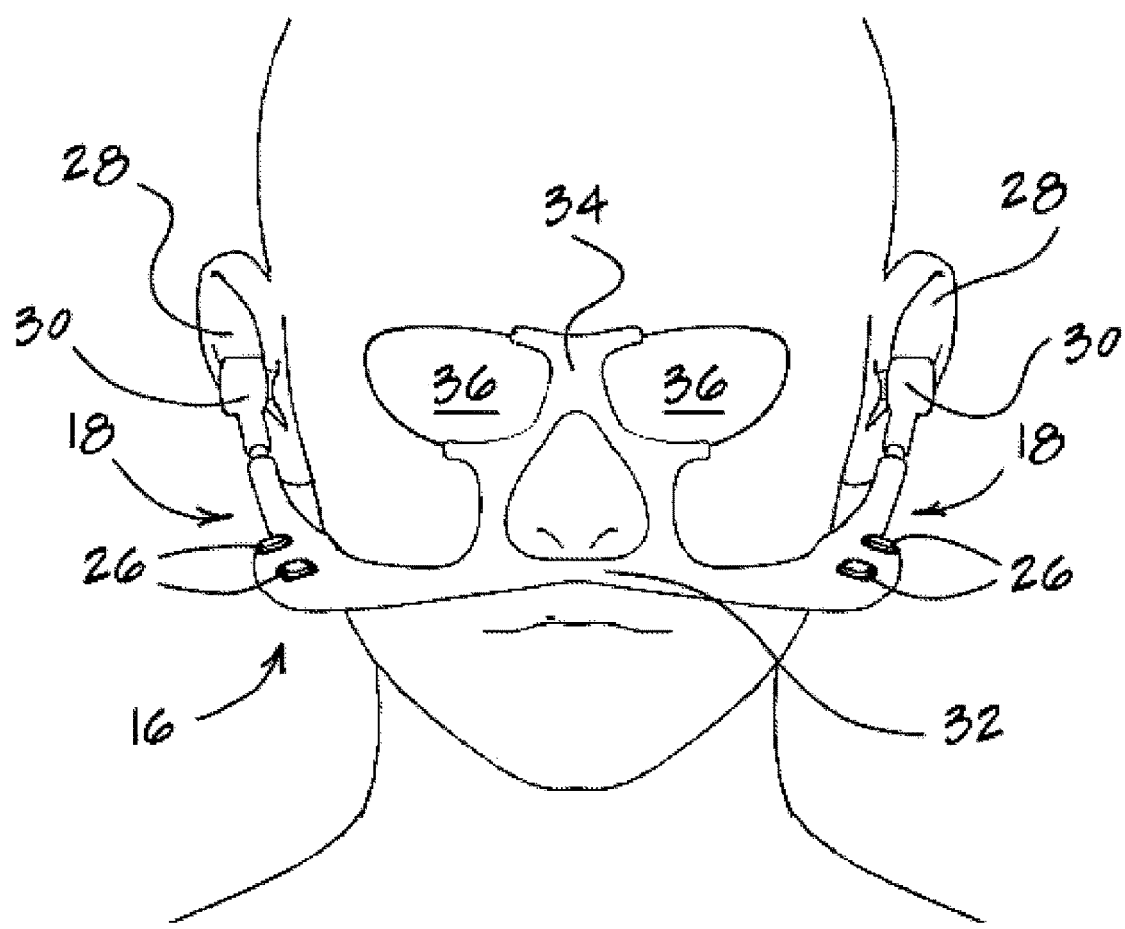
FIG. 3A is a front view of eyewear comprising an A-frame front portion comprising a philtral bridge.
Figure 3B:
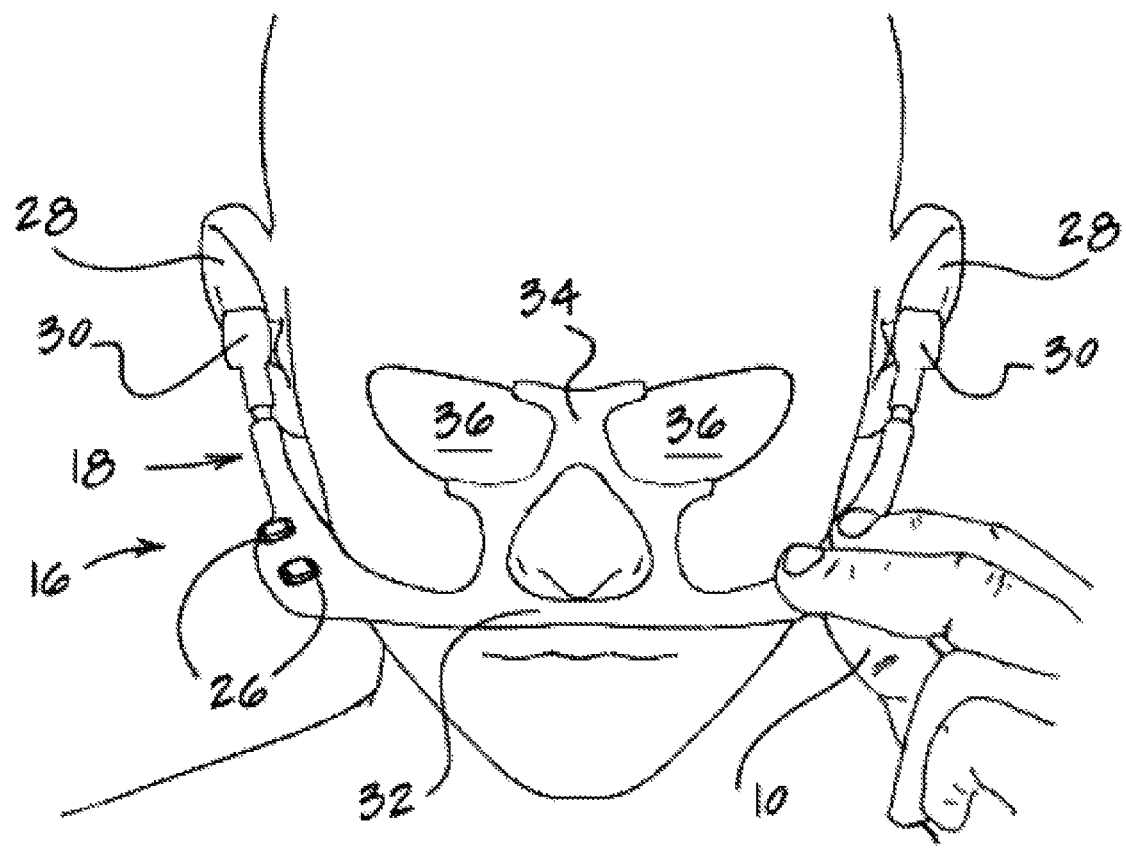
FIG. 3B is a front view of the eyewear of FIG. 3A showing a user's hand accessing controls for an electronic device.

A particular preferred embodiment of the invention takes advantage of the lower than usual temple and provides eyewear having a sub-nasal or philtral bridge 32, as depicted in FIGS. 3A and 3B. The embodiment may also incorporate a more traditional supra-nasal bridge 34 and portions supporting lenses 36 as well, thus providing the A-frame face piece depicted in FIGS. 3A and 3B. This face piece can be combined with the preferred intra-conchal ear bud rear supports 30, or may be combined with ear-loop rear supports (not shown).

Although the present invention has been described with respect to several preferred embodiments, many modifications and alterations can be made without departing from the invention. Accordingly, it is intended that all such modifications and alterations be considered as within the spirit and scope of the invention as defined in the attached claims.

The invention claimed is:

1. Apparatus comprising, in combination, an eyewear and an electronic device, the eyewear comprising a temple having a palpable alignment feature in a portion extending below a user's zygomatic arch when the eyewear is worn; the electronic device comprising a control disposed on the temple adjacent the alignment feature, wherein the position of the alignment feature is selected so that when the eyewear is worn the user's thumb, when pushed into a zygomatic pocket, engages the alignment feature and at least one other of the user's fingers is guided to contact the control.

2. The apparatus of claim 1 wherein the alignment feature is a notch.

3. The apparatus of claim 1 wherein the control is above the alignment feature.

4. The apparatus of claim 1 wherein the eyewear further comprises a front portion configured for receiving lenses extending upward therefrom.

5. The apparatus of claim 1 wherein the eyewear further comprises a front portion comprising a sub-nasal bridge.

6. The apparatus of claim 1 wherein a rear end of the temple comprises an ear bud insertable into the wearer's concha and operable to provide an audio output from the electronic device.

7. A method of delivering an audio output of an electronic device fixedly attached to an item of eyewear, the method comprising steps carried out by a user of:
donning the item of eyewear having at least a portion of one temple disposed below the user's zygomatic arch, the temple further having a control portion of the electronic device fixedly attached thereto adjacent an alignment feature;
engaging the alignment feature by pushing a first digit into a zygomatic pocket disposed below the user's zygomatic arch and moving a second digit into operative contact with the control portion of the electronic device; and
using the control portion of the electronic device to select the audio output for delivery through an intra-conchal rear support portion of the temple.

8. The method of claim 7 wherein the first digit is the thumb.

9. The method of claim 7 wherein the alignment feature comprises a notch.

10. Apparatus comprising, in combination, an eyewear and an electronic device having an audio output, the eyewear comprising a temple having a tubular intra-conchal rear support portion and an alignment feature formed in a portion extending below a prominence of a user's cheekbone when the eyewear is worn; the device comprising a control disposed on the temple adjacent the alignment feature, wherein the position of the alignment feature is selected so that when the eyewear is worn the user's thumb, when pushed into a space below the prominence of his or her cheekbone, engages the alignment feature and at least one other of the user's fingers contacts the control which is operable to control the audio output supplied through the tubular rear support portion of the temple.

11. The apparatus of claim 10 wherein the alignment feature comprises a notch.

12. The apparatus of claim 10 wherein the control is above the alignment feature.

13. The apparatus of claim 10 wherein the eyewear further comprises a front portion configured for receiving lenses extending upward therefrom.

14. The apparatus of claim 10 wherein the eyewear further comprises a front portion comprising a sub-nasal bridge.

* * * * *